United States Patent
Debras et al.

(10) Patent No.: US 6,302,461 B1
(45) Date of Patent: *Oct. 16, 2001

(54) TRANSPORT AND/OR COLLECTION DEVICE MADE OF MOLDED PLASTICS MATERIAL AND INCLUDING AN IDENTITY DEVICE, AND A METHOD OF MANUFACTURE

(75) Inventors: Jean-Jacques Debras, Saclay; Bernard Plissonnier, Peigney, both of (FR)

(73) Assignee: Compagnie Plastic Omnium, Lyons (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,909

(22) Filed: Sep. 18, 1998

(30) Foreign Application Priority Data

Sep. 22, 1997 (FR) .................................................. 97 11760

(51) Int. Cl.$^7$ ......................... G06K 19/077; G06F 17/00; G01G 19/08
(52) U.S. Cl. .................. 294/68.1; 177/139; 264/272.15; 264/272.17
(58) Field of Search ........................... 294/68.1, 90, 907; 264/272.11, 272.15, 272.17, 255; 235/492; 340/10.1–10.6; 177/139, 25.19

(56) References Cited

U.S. PATENT DOCUMENTS

| | | | |
|---|---|---|---|
| 4,460,537 | * | 7/1984 | Heinle .............................. 264/272.17 |
| 4,703,327 | * | 10/1987 | Rossetti et al. ......................... 342/44 |
| 4,737,789 | * | 4/1988 | Nysen ..................................... 342/51 |
| 4,737,790 | * | 4/1988 | Skeie et al. ............................. 342/51 |
| 4,778,209 | * | 10/1988 | Zosky et al. ......................... 294/68.1 |
| 4,816,839 | * | 3/1989 | Landt .................................... 343/795 |
| 5,095,240 | * | 3/1992 | Nysen et al. ........................... 342/44 |
| 5,106,785 | * | 4/1992 | Rauchmaul et al. ............ 264/272.11 |
| 5,218,759 | * | 6/1993 | Juskey et al. .................... 264/272.17 |
| 5,223,851 | * | 6/1993 | Hadden et al. ....................... 343/873 |
| 5,230,393 | * | 7/1993 | Mezey .................................. 177/139 |
| 5,304,744 | * | 4/1994 | Jensen ................................. 177/136 |
| 5,326,939 | * | 7/1994 | Schafer ............................... 177/139 |
| 5,392,926 | * | 2/1995 | Schafer ............................... 209/546 |
| 5,401,915 | * | 3/1995 | Schafer ............................... 177/139 |
| 5,419,864 | * | 5/1995 | Sheer et al. ..................... 264/272.11 |
| 5,460,292 | * | 10/1995 | Holdman .............................. 220/675 |
| 5,491,483 | * | 2/1996 | D'Hont ................................. 342/42 |
| 5,566,441 | * | 10/1996 | Marsh et al. ........................... 29/600 |
| 5,568,684 | * | 10/1996 | Wong ............................... 264/272.17 |
| 5,629,498 | * | 5/1997 | Pollock et al. ........................ 177/15 |
| 5,644,489 | * | 7/1997 | Hagenbuch ..................... 364/424.07 |
| 5,808,558 | * | 9/1998 | Meek et al. ..................... 340/870.01 |
| 5,859,587 | * | 1/1999 | Alicot et al. ......................... 340/572 |
| 5,879,502 | * | 3/1999 | Gustafson ............................ 156/292 |
| 5,894,006 | * | 4/1999 | Herbst ............................. 264/272.17 |
| 5,895,620 | * | 4/1999 | Pas et al. ......................... 264/272.17 |
| 5,912,622 | * | 6/1999 | Endo et al. ........................ 340/572.5 |
| 6,081,997 | * | 7/2000 | Chia et al. ....................... 264/272.17 |
| 6,206,282 | * | 3/2001 | Hayer, Sr. et al. ................... 235/375 |

FOREIGN PATENT DOCUMENTS

| | | |
|---|---|---|
| 9212243 | 1/1993 | (DE) . |
| 9402392 | 5/1994 | (DE) . |
| 9409175 | 9/1994 | (DE) . |
| 4437808 | 4/1996 | (DE) . |
| 0472127 | 8/1991 | (EP) . |
| 0495947 | 5/1995 | (EP) . |
| 91/20057 | 12/1991 | (WO) . |

* cited by examiner

Primary Examiner—Eileen D. Lillis
Assistant Examiner—Paul T. Chin
(74) Attorney, Agent, or Firm—Schweitzer Cornman Gross & Bondell LLP

(57) ABSTRACT

The invention relates to a transport and/or collection device of molded plastics material including an electronic identity device such as a transponder, the identity device being integrated in a wall of the transport and/or collection device while the wall is being molded. The identity device is housed at least in part in a protective shell with the wall (2) being molded in contact therewith.

12 Claims, 2 Drawing Sheets

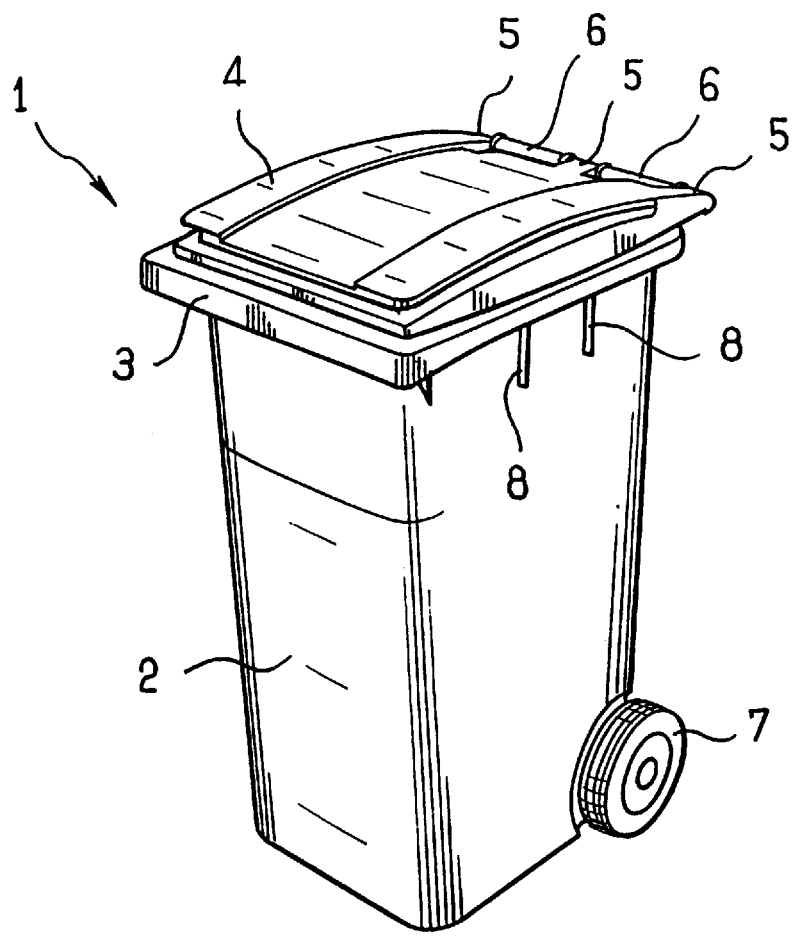
FIG_1
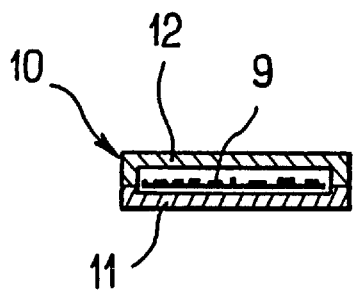
FIG_2
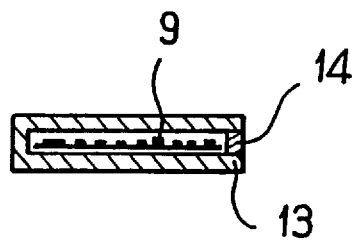
FIG_3

TRANSPORT AND/OR COLLECTION DEVICE MADE OF MOLDED PLASTICS MATERIAL AND INCLUDING AN IDENTITY DEVICE, AND A METHOD OF MANUFACTURE

BACKGROUND OF THE INVENTION

1. Field of the Invention

The present invention relates to a transport and/or collection device of molded plastics material that includes an electronic identity device such as a transponder, and it relates more particularly, but not exclusively, to a container for collecting waste or garbage.

2. Description of the Prior Art

In the context of collecting waste, for example, the identity device makes it possible to identify the container and to bill the user as a function of the weight of waste collected.

European patent 0 495 947 proposes integrating the identity device in the collar of the container in the form of an insert around which the plastics material constituting said wall is injected molded.

Nevertheless, that solution can be envisaged only when the identity device does not run any risk of being damaged by the temperature and/or pressure of the plastics material in the mold.

Otherwise, patent 0 495 947 proposes making a recess in the collar of the container and then inserting the identity device in the recess and holding it in place by means of a cover which is fixed by heat sealing, adhesive, screws, or rivets.

So far as the Applicant company is aware, no identity device exists that includes ordinary electronic circuits that is capable of withstanding the temperature and pressure of the plastics material in the mold without any risk of being damaged.

That is why, in practice, it is the solution using a cover that has been implemented whenever the identity device is somewhat complex.

Nevertheless, that technique does not give complete satisfaction, particularly concerning the reliability with which the cover is fixed.

German patent application DE-A-44 37 808 discloses a method of installing an identity device constituted by an antenna and a microcircuit on an object that is injection molded.

Initially, the plastics material is molded over a shell filled with a gel and housing the antenna.

Thereafter the microcircuit is fitted to the object, e.g. being held by a fixing piece or being embedded in a drop of adhesive.

In such a method, the identity device is not integrated in the object while it is being molded since installing the identity device requires an additional operation of fixing the microcircuit after the material has been molded.

SUMMARY OF THE INVENTION

The object of the present invention is to provide a novel transport and/or collection device of molded plastics material such as a container for collecting waste, for example, the device being of the type including an electronic identity device integrated during molding in a wall thereof, the reliability with which the identity device is mounted being improved over prior art transport and/or collection devices without the cost of installing the identity device becoming excessive.

According to the invention, the transport and/or collection device is characterized by the fact that the identity device is housed at least in part in a protective shell, with a wall of the transport and/or collection device being molded in contact with the shell.

By means of the invention, the identity device is completely integrated in the transport and/or collection device during molding, thus without any need to provide an additional assembly step for fitting an element of the identity device after molding, and without any risk of the temperature- and/or pressure-sensitive circuits of the identity device being destroyed.

Preferably, the identity device is completely encapsulated in said protective shell.

In a particular embodiment, the protective shell is in the form of a box made of plastics material.

The box can be made, for example, by assembling together a bottom and a lid, or in a variant it can be made as a single piece, the identity device then being placed inside the box either through an opening thereof, which opening is then closed, or else by closing two half-boxes onto the identity device, which half-boxes are held together by a film hinge.

In a particular embodiment, the protective shell is completely embedded in said wall.

In a variant, the protective shell has a face that opens out to the surface of said wall, preferably in the outside surface thereof.

In another variant, the protective shell has two opposite faces opening out into surfaces of said wall.

In a particular embodiment, the protective shell is contained in a swelling on said wall.

In the particular case of a container for collecting waste, the protective shell can be integrated, e.g. in the front wall of the bin of the container or in its collar, whereby the container is engaged by the hoist of the collection vehicle.

The invention also provides a method of manufacturing a transport and/or collection device, the method being characterized by the fact that it comprises the steps consisting in:

encapsulating the identity device at least in part in a material suitable for protecting it during the step of molding the transport and/or collection device; and molding a wall of the transport and/or collection device in contact with the identity device encapsulated in this way.

The identity device is preferably fully encapsulated in said material suitable for protecting it during molding of said wall.

BRIEF DESCRIPTION OF THE DRAWINGS

Other characteristics and advantages of the present invention appear on reading the following detailed description of a non-limiting embodiment of the invention, and on examining the accompanying drawings, in which: container for collecting waste;

FIG. 1 is a diagrammatic perspective view of a container for collecting waste;

FIGS. 2 and 3 are diagrammatic sections through two embodiments of an encapsulated identity device in accordance with the invention.

DESCRIPTION OF THE PREFERRED EMBODIMENT

Figure 4:
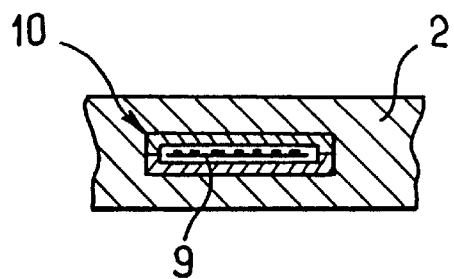
FIGS. 4 to 8 are sections showing various ways in which the encapsulated identity device can be integrated in the wall of the container.

The container or bin 1 shown in FIG. 1 comprises a vessel 2 of plastics material provided at its top edge with a collar 3 integrally molded with the vessel and serving to stiffen it and to enable the container to be handled by the hoist member of the collection vehicle.

A lid 4 is hinged on the vessel 2 in conventional manner by means of hinges 5 disposed on either side of handles 6.

Wheels 7 are also provided as are stiffening ribs 8 which are made on the outside of the vessel 2 beneath the collar 3.

The container 1 is emptied by lifting it and tilting it forwards after the hoist member of a collection vehicle has been inserted beneath the collar 3 on its side remote from the hinges 5 and the handles 6.

An electronic identity device such as a transponder is incorporated in the container, and the collection vehicle is provided with appropriate reading and recording means enabling information to be interchanged with the transponder.

The collection vehicle can be organized to weigh each container while it is emptying it so as to evaluate the quantity of waste collected therefrom.

The total mass of waste collected during a given period can be stored in the transponder so as to make it possible to bill the user in proportion to the quantity of waste collected as opposed to charging a fixed sum.

The transponder can also be useful in managing maintenance operations on the container.

By way of example, the transponder used can be of the type described in European patent 0 412 020, comprising a microprocessor and at least one memory.

In accordance with the invention, the transponder is housed in a protective shell which, in the embodiment described, is constituted by a box of injected plastics material.

FIG. 2 shows in highly diagrammatic manner a transponder 9 received in a box 10 constituted in this case by assembling together a bottom 11 and a lid 12.

In a variant, as shown in FIG. 3, the box 10 is made as a single piece of plastics material and includes a side opening 13 through which the transponder can be inserted. The opening 13 is closed after the transponder has been put into place by closure means 14 which may be constituted, for example, by a flap connected to the body of the box by means of a film hinge.

The box 10 within which the transponder 9 is received can be placed in various locations in the container, for example in the front wall of the vessel 2 or in the collar 3, the important point being that it must be possible to establish a link, e.g. by radio, between the transponder and the read and/or recording means present in the collection vehicle.

FIGS. 4 to 8 show various, non-limiting ways in which the box 10 can be integrated in the wall of the container in the context of the present invention.

As shown in FIG. 4, the box 10 can be completely embedded in the thickness of the wall of the container, e.g. in the thickness of the front wall of the vessel 2.

Figure 5:
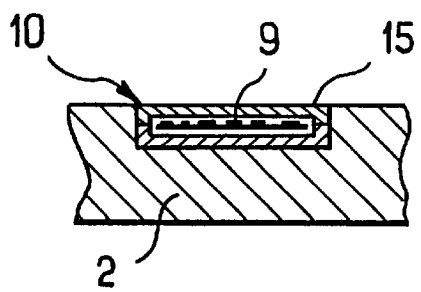

In a variant, as shown in FIG. 5, the box 10 is not completely embedded in the thickness of the wall of the container, but has a face 15 which is flush with a surface thereof.

Where so desired, this embodiment makes it possible to write information on the visible face 15 of the box 10, or to use the color of the box to indicate the kind of waste that is to be collected, e.g. glass or plastic.

Figure 6:
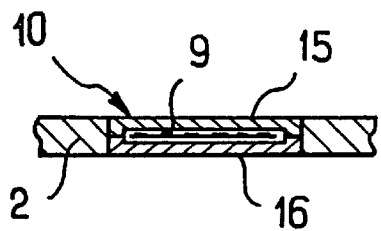

As shown in FIG. 6, it is also possible to ensure that the box 10 has two opposite faces 15 and 16 each of which is flush with the surface of the wall of the container.

Figure 7:
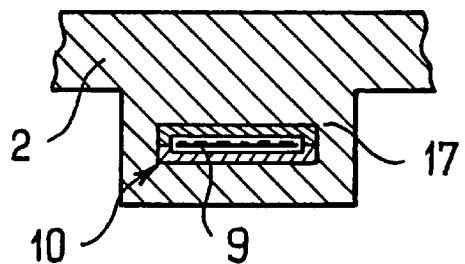
Figure 8:
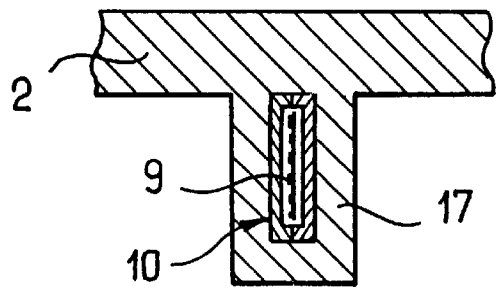

In other variants shown in FIGS. 7 and 8, the box 10 is embedded in an internal or external swelling 17 integrally formed with the wall of the container.

In general, the orientation of the box is chosen so as to be best suited for interchanging information with the read/recording means of the collection vehicle.

It is thus possible, in a variant that is not shown, to incline the box relative to the surface should that give greater freedom in selecting the position of the read/recording means of the collection vehicle.

By means of the invention, the transponder 9 can be integrated in a container wall while the wall itself is being molded, even if the transponder is made of fragile electronic components that are liable to be damaged by the temperature and/or the pressure of the plastics material in the mold.

In addition, the transponder 9 can be positioned accurately, since once the wall of the container has been molded around the box 10, there is no longer any likelihood of the box moving relative to the wall of the container, and the transponder 9 is preferably also secured relative to the box 10 by any suitable means.

In this respect, it should be observed that it is easy to make relief inside the small volume of the box 10 for the purpose of holding the transponder in position, whereas it would be difficult to make such relief directly in the wall of the container which is much larger.

The transponder can also be held in place inside the box 10 by using an elastomer material, for example, which has the advantage of absorbing shock.

In the embodiments described, it is not impossible to extract the identity device from the container without damaging it, and the transponder is thus held in the container in particularly reliable manner.

It would not go beyond the ambit of the present invention to encapsulate the transponder in any other manner so as to protect it from the temperature and/or the pressure of the plastics material during molding, which can be performed by injection, extrusion, blow molding, rotary molding, thermoforming, or indeed by any other technique for transforming plastics material.

In particular, the transponder can be encapsulated in a protective shell made of a material which is not necessarily rigid, said shell may also be arbitrary in shape and need only cover the fragile components of the transponder.

Without going beyond the ambit of the present invention, it is also possible to protect the transponder by overmolding a mere protective skin of plastics material thereon.

The material constituting the protective shell may indeed soften during molding of the container wall, the essential point is that the protective shell ensures that the transponder is given sufficient protection against the temperature and/or pressure of the plastics material in the mold.

The invention applies not only to a container for collecting waste, but can also be applied to the field of devices for transporting goods, such as pallets or cases and bins for handling purposes.

What is claimed is:

1. A transportable plastic collection device, said device including:
    (a) walls being formed by molding;
    (b) an electronic transponder means completely housed within a protective shell of plastic material of sufficient strength to protect said transponder means against the pressure and temperatures encountered during molding; of said walls so that said transponder remains operational after molding of said walls; and (c) said shell being embedded into one of said collecting device walls during molding thereof, said one collecting device wall having a surface inside said wall formed during molding and in contact with said shell and being exactly complementary thereto.

2. The device according to claim 1, wherein said protective shell is in the form of a box of plastic material.

3. The device according to claim 2, wherein said box is made by assembling together a bottom and a lid.

4. The device according to claim 2, wherein the box is made as a single piece.

5. The device according to claim 1, wherein said protective shell is partially embedded in the thickness of said wall.

6. The device according to claim 1, wherein the transponder means is fully encapsulated in the protective shell.

7. The device according to claim 1, wherein said protective shell has a face flush with the outer surface of said one wall.

8. The device according to claim 1, wherein said protective shell has two opposite faces flush with respective surfaces of said one wall.

9. The device according to claim 1, wherein said protective shell is situated in a swelling of said wall.

10. The device according to claim 1, configured for collection of waste.

11. The device according to claim 10, wherein the transponder is integrated in the front wall.

12. The device according to claim 10, wherein the transponder is integrated in a collar adapted to be engaged to lift the container.

* * * * *